Figure 1:
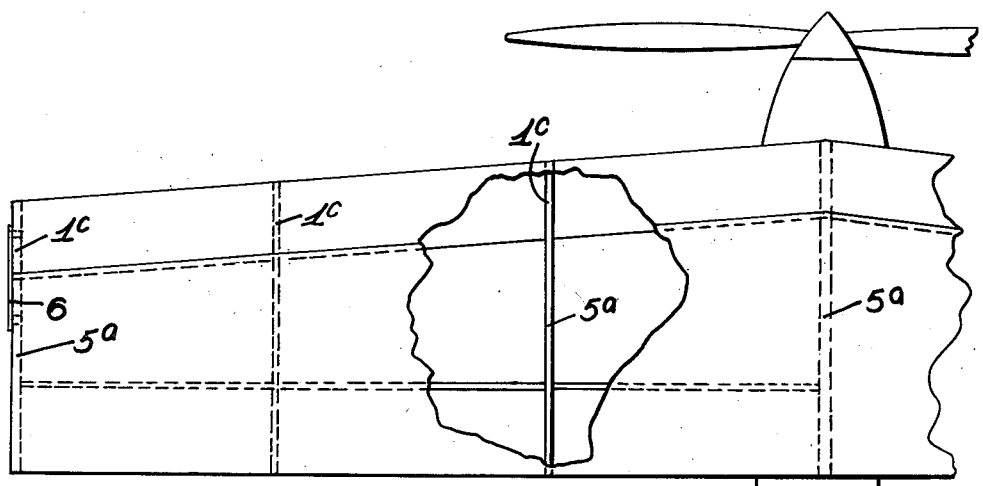

Aug. 5, 1952 B. H. ROBINSON 2,605,984
AIRCRAFT WING AND BRAKE
Filed Jan. 6, 1945 2 SHEETS—SHEET 1

INVENTOR.
BENJAMIN H. ROBINSON
BY
A. B. Bowman
ATTORNEY

Aug. 5, 1952  B. H. ROBINSON  2,605,984
AIRCRAFT WING AND BRAKE
Filed Jan. 6, 1945  2 SHEETS—SHEET 2

INVENTOR.
BENJAMIN H. ROBINSON
BY
A. B. Bowman
ATTORNEY

Patented Aug. 5, 1952

2,605,984

UNITED STATES PATENT OFFICE 2,605,984

AIRCRAFT WING AND BRAKE

Benjamin H. Robinson, San Diego, Calif., assignor of one-half to James A. Nesbitt, San Diego, Calif.

Application January 6, 1945, Serial No. 571,561

3 Claims. (Cl. 244—42)

My invention relates to an aircraft wing and brake, more particularly to an airfoil having a relatively shiftable leading edge portion which operates efficiently as a brake and as the leading edge of the airfoil, and the objects of my invention are:

First, to provide an aircraft wing and brake of this class having a maximum amount of lift and a minimum amount of drag due to the particular laminar structure of the wing and the communication therewith of the leading edge portion thereof;

Second, to provide an aircraft wing and brake of this class in which the air flow passes from the trailing edge to the inner rear side of the leading edge through the laminar structure and outwardly through a slot at the rear of the leading edge providing a very efficient aerodynamic arrangement;

Third, to provide an aircraft wing and brake of this class in which the leading edge thereof is relatively pivotally mounted with respect to the main wing section whereby laminar portions of the wing sections are exposed above the rear of the leading edge portion providing a very efficient aerodynamic brake;

Fourth, to provide an aircraft wing of this class which tends to move toward the oncoming airflow due to the large area exposed to the reverse airflow passing forwardly between the laminar section of the wing and venting through the slots at the lower and rear of the leading edge portion;

Fifth, to provide an aircraft wing and brake of this class which may be used in connection with airplanes requiring heavy braking action such as those landed on the deck of an airplane carrier or the like;

Sixth; to provide an aircraft wing and brake of this class having a lifting tendency which increases in proportion to the drag when used as a brake to slow up the airplane in connection with which it is used;

Seventh, to provide an aircraft wing and brake of this class in which the pivotal relationship of the leading edge portion is so arranged that it is aerodynamically balanced;

Eighth, to provide an aircraft wing and brake of this class having novel airflow directing means which relieve vacuum at the trailing edge thereof forwardly through the structure toward the leading edge from which it is jettisoned by external airflow in relation therewith;

Ninth, to provide an aircraft wing of this class having a maximum amount of lift and a minimum amount of drag due to the particular laminar structure of the wing and the communication therewith of the leading edge portion thereof; and Tenth, to provide an aircraft wing and brake of this class which is very simple and economical of construction, efficient in its action and which will not readily deteriorate or get out of order.

Figure 2:
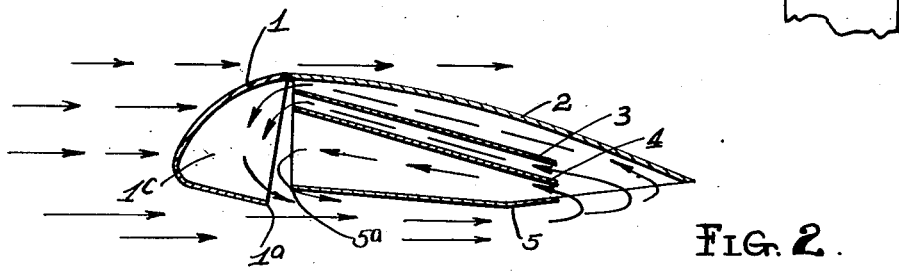
Figure 3:
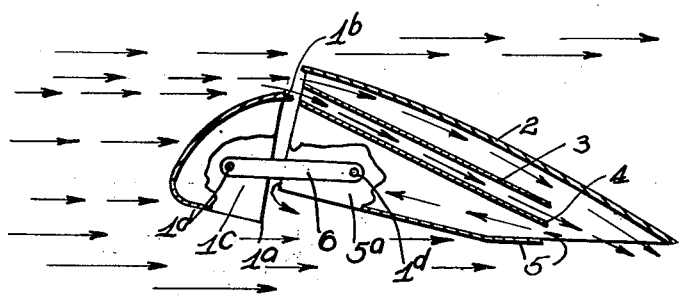
Figure 4:
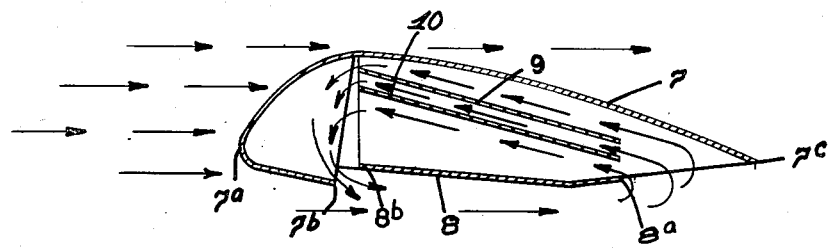
Figure 5:
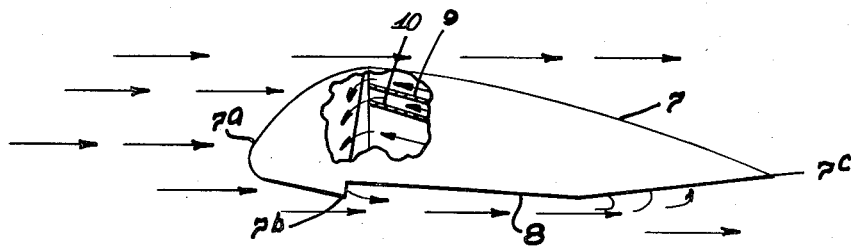

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary top or plan view of my aircraft wing and brake shown in connection with an airplane; Fig. 2 is an enlarged cross sectional view of my aircraft wing and brake showing by arrows the air flow relatively thereto; Fig. 3 is a view similar to that shown in Fig. 2 illustrating the relative pivotal relationship of the leading edge with the aircraft wing when operated as a brake; Fig. 4 is a cross sectional view of a modified form of invention showing the airfoil section in action and illustrating by arrows the flow of air relatively thereto; and Fig. 5 is an end view of the structure as shown in Fig. 4 of the drawings showing a portion broken away to amplify the illustration and further illustrating the flow of air by arrows in relation to the structure.

Similar characters of reference refer to similar parts and portions throughout the several views of the drawings;

The leading edge member 1, laminar foils 2, 3, 4, and 5, and the control bracket 6 constitute the principal parts and portions of my aircraft wing and brake.

The leading edge member 1 is preferably coextensive with the aircraft wing and is curved in cross section conforming to a conventional leading edge form, as shown best in Fig. 2 of the drawings. The cross sectional shape of this leading edge member is maintained by spaced rib portions 1c, as shown best in Figs. 1 and 2 of the drawings. The upper rear edge of this leading edge member 1 is provided with an overlapping portion 1b arranged to fit under the forward edge of the laminar foil 2 which forms the upper surface of the aircraft wing. The laminar foils 3 and 4 are arranged in substantially superposed spaced relation with the laminar foil 2 and the laminar foil 4 forms the lower surface of the wing, as shown best in Fig. 2 of the drawings.

It will be noted that the rear edges of these laminar foils 2, 3, 4 and 5 are open in spaced relation with each other whereby air is permitted to flow uninterrupted therebetween. The ribs 5a maintain the laminar foils 2, 3, 4 and 5 in rigid spaced relation to each other, as is shown best in Fig. 1 of the drawings. Pivotally connected to the ribs 5a are the control brackets 6 by means of pins 1d. The opposite ends of these control brackets 6 are pivotally connected to the leading edge by means of the pins 1d in connection with the rib portion 1c, as sown best in Figs. 1 and 3 of the drawings.

It will be noted that when the leading edge member 1 is in the position as shown in Fig. 2 of the drawings the forward edge 5a of the lowermost foil 5 is in spaced relation to the lower trailing edge 1a of the leading edge member 1 forming a longitudinal slot therebetween extending along the lower side of the wing and communicating with the forward edges of the foil members 2, 3 and 4. The forward edge 5a of the foil member 5, however, is positioned above the trailing edge 1a of the leading edge member 1 providing a jet-like arrangement as indicated by the arrows in Fig. 2 of the drawings.

The operation of my aircraft wing and brake is substantially as follows:

When my aircraft wing and brake is passing through the air, an air stream is set up relatively therewith and the flow of air passes as shown by arrows in Fig. 2 of the drawings and a portion of the air is diverted to a forwardly return flow intermediate the laminar foils 2, 3, 4 and 5 toward the leading edge member 1, which is substantially C shaped in cross section, as shown in Fig. 2 of the drawings. The airflow passing forwardly is diverted downwardly and passes downwardly and backwardly through the slots between the leading edge member at its lower rear edge 1a and the forward edge of the laminar foil 5. As shown in Fig. 3 of the drawings, the aircraft wing and brake is operated by the relative angular pivoted relationship of the leading edge member 1 to provide an increase in the drag in order to slow down the aircraft to which it is attached. As shown in Fig. 3 the forward edges of the laminar foils 2 and 3 are above the leading edge member 1 whereby a portion of the airflow passes intermediate the laminar foils 2, 3 and 4 while a lesser portion of the airflow passes forwardly intermediate the laminar foils 4 and 5 and then downwardly and backwardly from the rear lower edge 1a of the leading edge member 1, thus the drag of the wing is increased and the pivotal relationship of the leading edge effects a braking action tending to slow down the aircraft to which it is connected. It is well known that air is a physical substance and it will be obvious that the reaction thereof in connection with my aircraft wing and brake will be better understood as such. As the air flows past the lower side of the leading edge member 1 and reaches the trailing edge portion 1a thereof it creates a partial vacuum rearwardly of the trailing edge portion 1a as a result of the elevated disposition of the forward edge portion 5a of the foil 5 which is above such trailing edge portion 1a. This partial vacuum is relieved by air within the wing passing forwardly between the foils 2, 3, 4 and 5, as indicated by arrows in Fig. 2 of the drawings. Simultaneously, the air passing backwardly toward the rear edges of the foils 3, 4 and 5 encounters a low pressure area which it readily enters whereby the air is caused to pass from the trailing edge of the wing toward the leading edge thereof and is exhausted through the slot between the edge portions 1a and 5a due to the partial vacuum existing rearwardly of the trailing edge portions 1a of the leading edge member 1. When the leading edge member 1 and the foils 2, 3, 4 and 5 are pivoted relatively thereto the drag and lift is increased which may be advantageous in either takeoff or landing operation.

The modified form of my invention, as shown in Figs. 4 and 5 of the drawings is provided with an upper airfoil member 7 having an integral leading edge portion 7a which is substantially C-shaped in cross section, as shown best in Fig. 4 of the drawings. This C-shaped in cross section leading edge portion 7a is provided with a trailing edge portion 7b which extends backwardly and below the lowermost airfoil member 8 which forms the lower surface of the aircraft wing.

Positioned intermediate the airfoil members 7 and 8 are the laminar foil members 9 and 10. These laminar foil members 9 and 10 are arranged in superposed spaced relation to each other and are spaced from the airfoil members 7 and 8 providing a series of fore and aft slots or passages through which the air flow takes place, as indicated by the arrows in Fig. 4 of the drawings.

It will be noted that the airfoil member 8 forming the lower surface of the aircraft wing terminates at its trailing edge portion 8a some distance forwardly of the trailing edge portion 7c of the airfoil member 7 providing an opening communicating with the spaces intermediate the laminar foil members 9 and 10 between the airfoil members 7 and 8.

The leading edge 8b of the airfoil member 8 which forms the lower surface of the aircraft wing is positioned rearwardly and above the trailing edge portion 7b of the C-shaped in cross section leading edge portion 7a of the airfoil member 7 providing a slot longitudinally disposed of the forward lower portion of the aircraft wing communicating with the spaces intermediate said laminar foils 9 and 10 and between the airfoil members 7 and 8.

The operation of the modified structure as shown in Figs. 4 and 5 of the drawings is substantially the same as that of the structure described in connection with Figs. 1, 2 and 3 of the drawings with the exception that the leading edge portion 7a of the aircraft wing is integral and rigidly connected with the aircraft wing and does not perform the pivotal change of position as does the leading edge member 1 of the structure disclosed in Figs. 1, 2 and 3 of the drawings.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. A wing having a leading edge structure, an upper foil member having a trailing edge, said leading edge structure concavo-convex in cross-section and being convex at its foremost portion, said leading edge structure forming a forward continuation of the surface of the upper airfoil member and extending forwardly and downwardly to said foremost portion, and extending downwardly and backwardly from said foremost portion toward said trailing edge of said upper airfoil member, said upper airfoil member and said leading edge structure of said wing solid and air-tight throughout their entire surfaces, a lower foil member vertically spaced from said upper foil member and having a forward edge and a rear edge, the forward edge of said lower foil member spaced from and above the lower edge of said leading edge structure of said wing, defining an opening near the leading edge structure of said wing at the lower side thereof, and a plurality of internal foil members, each having forward and rear edges vertically spaced relative to each other and to the upper and lower foil members, said internal foil members enclosed within said wing partially by said upper foil member, and partially by said lower foil member and said leading edge structure of said wing, said rear edge of said lower foil member spaced from the trailing edge of said upper foil member, defining a second opening near the trailing edge of said upper foil member at the lower side of said wing, the forward edges of said internal foil members spaced from the rear concave portion of said leading edge structure of said wing and spaced from said first-mentioned slot, the rear edges of said internal foil members spaced from said second-mentioned slot, whereby drag or partial vacuum created rearwardly and above said lower edge of said leading edge structure of said wing causes air to pass into said wing through said second-mentioned slot and travel forwardly intermediate said upper and lower foil members and said internal foil members to the rear concave surface of said leading edge structure of said wing, and to pass downwardly and outwardly of said wing through said first-mentioned slot.

2. A wing having a leading edge structure, an upper foil member having a trailing edge, said leading edge structure concavo-convex in cross-section and being convex at its foremost portion, said leading edge structure forming a forward continuation of the surface of the upper airfoil member and extending forwardly and downwardly to said foremost portion, and extending downwardly and backwardly from said foremost portion toward said trailing edge of said upper airfoil member, said upper airfoil member and said leading edge structure of said wing solid and air-tight throughout their entire surfaces, a lower foil member vertically spaced from said upper foil member and having a forward edge and a rear edge, the forward edge of said lower foil member spaced from and above the lower edge of said leading edge structure of said wing, defining an opening near the leading edge structure of said wing at the lower side thereof, and a plurality of internal foil members, each having forward and rear edges vertically spaced relative to each other and to the upper and lower foil members, said internal foil members enclosed within said wing partially by said upper foil member, and partially by said lower foil member and said leading edge structure of said wing, said rear edge of said lower foil member spaced from the trailing edge of said upper foil member, defining a second opening near the trailing edge of said upper foil member at the lower side of said wing, the forward edges of said internal foil members spaced from the rear concave portion of said leading edge structure of said wing and spaced from said first-mentioned slot, the rear edges of said internal foil members spaced from said second-mentioned slot, whereby drag or partial vacuum created rearwardly and above said lower edge of said leading edge structure of said wing causes air to pass into said wing through said second-mentioned slot and travel forwardly intermediate said upper and lower foil members and said internal foil members to the rear concave surface of said leading edge structure of said wing, and to pass downwardly and outwardly of said wing through said first-mentioned slot, and pivotal hinge means connecting said leading edge structure to said wing, whereby the upper portion of said leading edge structure of said wing is movable to a position below the upper foil member.

3. A wing having a leading edge structure, an upper foil member having a trailing edge, said leading edge structure concavo-convex in cross-section and being convex at its foremost portion, said leading edge structure forming a forward continuation of the surface of the upper airfoil member and extending forwardly and downwardly to said foremost portion, and extending downwardly and backwardly from said foremost portion toward said trailing edge of said upper airfoil member, said upper airfoil member and said leading edge structure of said wing solid and air-tight throughout their entire surfaces, a lower foil member vertically spaced from said upper foil member and having a forward edge and a rear edge, the forward edge of said lower foil member spaced from and above the lower edge of said leading edge structure of said wing, defining an opening near the leading edge structure of said wing at the lower side thereof, and a plurality of internal foil members, each having forward and rear edges vertically spaced relative to each other and to the upper and lower foil members, said internal foil members enclosed within said wing partially by said upper foil member, and parially by said lower foil member and said leading edge structure of said wing, said rear edge of said lower foil member spaced from the trailing edge of said upper foil member, defining a second opening near the trailing edge of said upper foil member at the lower side of said wing, the forward edges of said internal foil members spaced from the rear concave portion of said leading edge structure of said wing and spaced from said first-mentioned slot, the rear edges of said internal foil members spaced from said second-mentioned slot, whereby drag or partial vacuum created rearwardly and above said lower edge of said leading edge structure of said wing causes air to pass into said wing through said second-mentioned slot and travel forwardly intermediate said upper and lower foil members and said internal foil members to the rear concave surface of said leading edge structure of said wing, and to pass downwardly and outwardly of said wing through said first-mentioned slot, and pivotal hinge means connecting said leading edge structure to said wing, whereby the upper portion of said leading edge structure of said wing is movable to a position below the upper foil member, said leading edge structure of said wing, at its juncture of continuity with said upper foil member, being near the uppermost extremity of said wing when in normal upright position.

BENJAMIN H. ROBINSON.

(References on following page)

REFERENCES CITED

The following references are of record in the file of this patent:

UNITED STATES PATENTS

| Number | Name | Date |
|---|---|---|
| 1,631,259 | Gilmore | June 7, 1927 |
| 1,810,693 | Alfaro | June 16, 1931 |
| 1,862,939 | Parker | June 14, 1932 |
| 1,915,481 | Ziegler | June 27, 1933 |
| 1,979,184 | Ziegler | Oct. 30, 1934 |
| 1,993,419 | Stalker | Mar. 5, 1935 |
| 2,041,790 | Stalker | May 26, 1936 |
| 2,041,792 | Stalker | May 26, 1936 |
| 2,252,528 | Sikorsky | Aug. 12, 1941 |

FOREIGN PATENTS

| Number | Country | Date |
|---|---|---|
| 14,296 | Australia | May 23, 1929 |
| 466,709 | Great Britain | May 27, 1937 |